United States Patent [19]

Hurlebaus et al.

[11] Patent Number: 4,482,798
[45] Date of Patent: Nov. 13, 1984

[54] AUTOMATIC ELECTRIC WELDING SYSTEM FOR MAINTAINING UNIFORM HEAT IN A WELDING OPERATION

[75] Inventors: Richard P. Hurlebaus, Huntingdon Valley; Herbert H. Kiser, Ambler, both of Pa.

[73] Assignee: The Budd Company, Troy, Mich.

[21] Appl. No.: 441,971

[22] Filed: Nov. 15, 1982

[51] Int. Cl.³ .............................................. B23K 9/12
[52] U.S. Cl. .............................................. 219/137.71
[58] Field of Search ...................... 219/130.21, 130.01, 219/137.71

[56] References Cited

U.S. PATENT DOCUMENTS 3,619,554 11/1971 Klebl ............................... 219/130.21
3,626,146 12/1971 Smith .............................. 219/130.21
4,375,026 2/1983 Kearney ......................... 219/130.01

FOREIGN PATENT DOCUMENTS 55-51670 3/1974 Japan .............................. 219/130.21

Primary Examiner—C. C. Shaw
Attorney, Agent, or Firm—Edward M. Farrell; Herman Foster; Thomas I. Davenport

[57] ABSTRACT

Three parameters represent speed, current and voltage are combined to produce an electrical signal representing a desired uniform heat for an operation in which a movable workpiece is involved. A set of electrical signals are developed during the actual operation and combined with the electrical signal representing the standard heat. A resulting error signal and feedback circuit maintain the heat at the workpiece substantially at the desired uniform heat.

9 Claims, 4 Drawing Figures

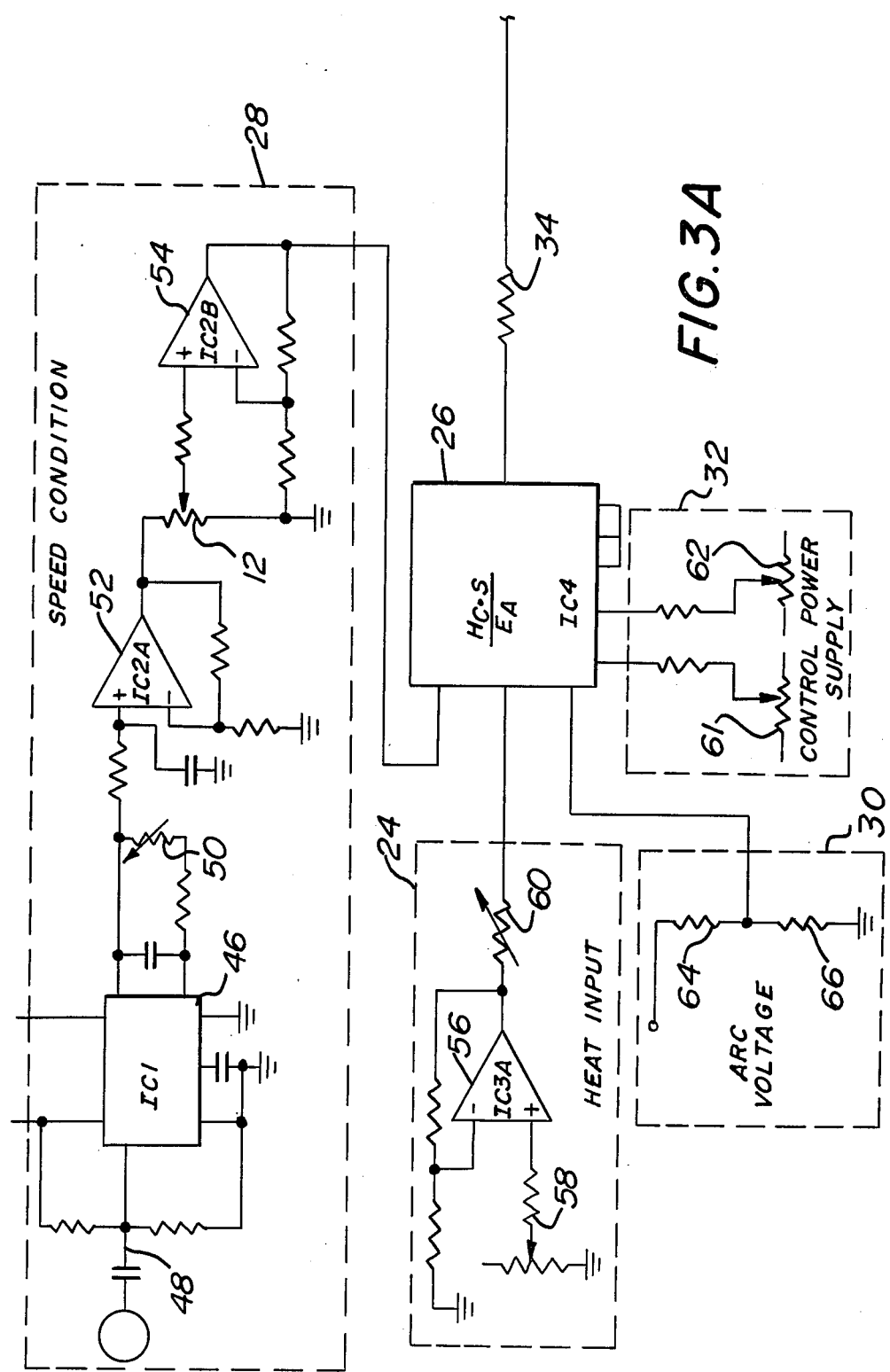

AUTOMATIC ELECTRIC WELDING SYSTEM FOR MAINTAINING UNIFORM HEAT IN A WELDING OPERATION

BACKGROUND OF THE INVENTION

Welding control systems have taken a wide variety of different forms. Many systems have been employed to monitor the current or voltage and utilize this data to provide signals which are included in a feedback network to control the welding operation.

Also, individual parameters, such as current, voltage and travel speeds have been used to provide an average value of heat input. This technique, however, produces an after-the-fact control signal and does not permit change of in-process heat inputs to maintain a standard level of heat input.

It is important in many cases to provide a constant heat input for a welding operation. An example of the importance of maintaining a constant heat input to an arc welding operation is in the manufacture of a truck wheel. In this operation, a disc involving a relatively thin cold material is welded to a relatively thick rim which is generally a hot rolled material. In such arc welding of wheels, it is important to provide precise heat inputs to establish minimum weld penetration and heat input while preserving the strength in the cold work disc by minimal annealing in the heat affected zone.

OBJECTS OF THE INVENTION

It is an object of this invention to provide an improved welding system in which the heat input is maintained relatively constant.

It is a further object of this invention to provide an improved welding system in which the heat input is maintained uniform and at a specific level to produce minimum penetration for soundness of the weld and without causing excessive annealing of the parts being welded together.

BRIEF SUMMARY OF THE INVENTION

In accordance with the present invention, a standard electrical signal is developed representing the speed related to a workpiece, arc current and arc voltage required to maintain uniform heat at the workpiece. Electrical signals are developed during operation representing these same parameters. Two of the electrical signals are combined with the standard electrical signal to produce an output signal substantially equal to the signal representing one of the parameters used to produce the standard electrical signals. The combined signals relate to the same parameter, such as current. The output of the combined signals is compared with the corresponding electrical signal developed during operation to produce an error signal. The error signal is used in a feedback network to control the function selected to maintain the desired uniform heat.

Other objects and advantages of the present invention will be apparent and suggest themselves to those skilled in the art, from a reading of the following specification and claims, taken in conjunction with the accompanying drawings.

BRIEF DESCRIPTION OF THE DRAWINGS

FIGS. 3a and 3b are shown on two separate sheets of drawing to be joined together, which is a schematic diagram, partly in block diagram form, illustrating circuit details of one embodiment of the present invention.

DETAILED DESCRIPTION OF THE PREFERRED EMBODIMENTS

In describing the present invention, a conventional welding system will be assumed. In this system, an arc welding operation is performed on a pair of pieces to be joined together. Arc welding operation may include a welding tool in which wire is continuously fed from a welding gun toward the workpiece to produce an arc between the wire and the workpiece to heat and melt the wire and bare metal to form the weld.

In such conventional systems, the three parameters involved are the arc welding voltage, the arc current, as related to the wire feed rate, and the speed of the workpiece involved. In the present invention, the control signal is produced, which takes into account a predetermined arc voltage, a predetermined arc current (wire feed rate), and a predetermined workpiece speed. An electrical signal is produced representing the appropriate combination of these three parameters. The heat input is the energy in joules per inch of length of the workpiece. This signal represents the heat input being applied to the workpiece and to be maintained constant during the welding operation.

Figure 1:
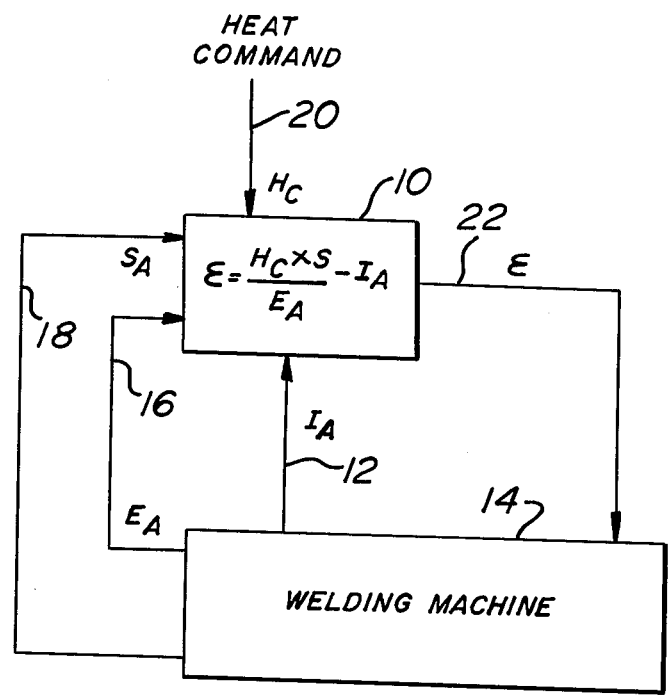
FIG. 1 is a block diagram illustrating a welding system, in accordance with the present invention.

Referring to FIG. 1, a multiplier-divider circuit 10 is adapted to receive a plurality of signals including the arc welding current $I_A$ at the line 12 developed at a welding machine 14, the arc welding voltage $E_A$ developed at the line 16 and the speed $S_A$ of the workpiece from the welding tool developed at the line 18. The signals at the lines 12, 16 and 18 are analog voltage signals representative of the parameters involved.

The heat command signal $H_C$ is developed at the line 20 and applied to the circuit 10. The heat command signal is an analog signal which is predetermined and representative of predetermined arc voltage, arc current and workpiece speed programmed into the welding machine. This heat command signal represents the quantity of heat that is desired in the weld joint. The circuitry, illustrated by the block 10, is designed to perform a number of calculations in order to develop an output error signal E at the line 22.

In the block 10, there are various multiplier-divider circuits as well as a comparison circuit, which will be subsequently illustrated in detail. In the embodiment illustrated, the actual welding current $I_A$ is compared with the calculated current $I_C$ used to produce the heat command signal at the line 20. Algebraic comparison of these two signals produce an error signal at the line 22. This heat control or error signal is used to speed up or slow down a wire feed mechanism which in turn will directly affect the arc current to stabilize it to the standard determined by the heat command signal at line 20.

The heat command signal is multiplied by the signal representing the welding speed. The product is then divided by the actual arc voltage signal to produce an output signal $I_C$ proportional to the current required to produce the desired heat. The actual arc current $I_A$ at the line 12 is subtracted or compared algebraically with the resultant signal from the calculation on the heat command signal, workpiece speed and arc voltage to produce the error signal at line 22 which in turn is used to speed up or slow down the wire feed drive mechanism and wire feed rate in the welding machine 14.

The circuitry involved in the block 10 illustrates how the error signal is produced by algebraically summing two current signals. In some cases it may be desirable to use the input voltage signal to produce an error signal or in another case, the signal representing the workpiece speed to produce the error signal by comparing each signal singularly with its corresponding standard signal.

Figure 2:
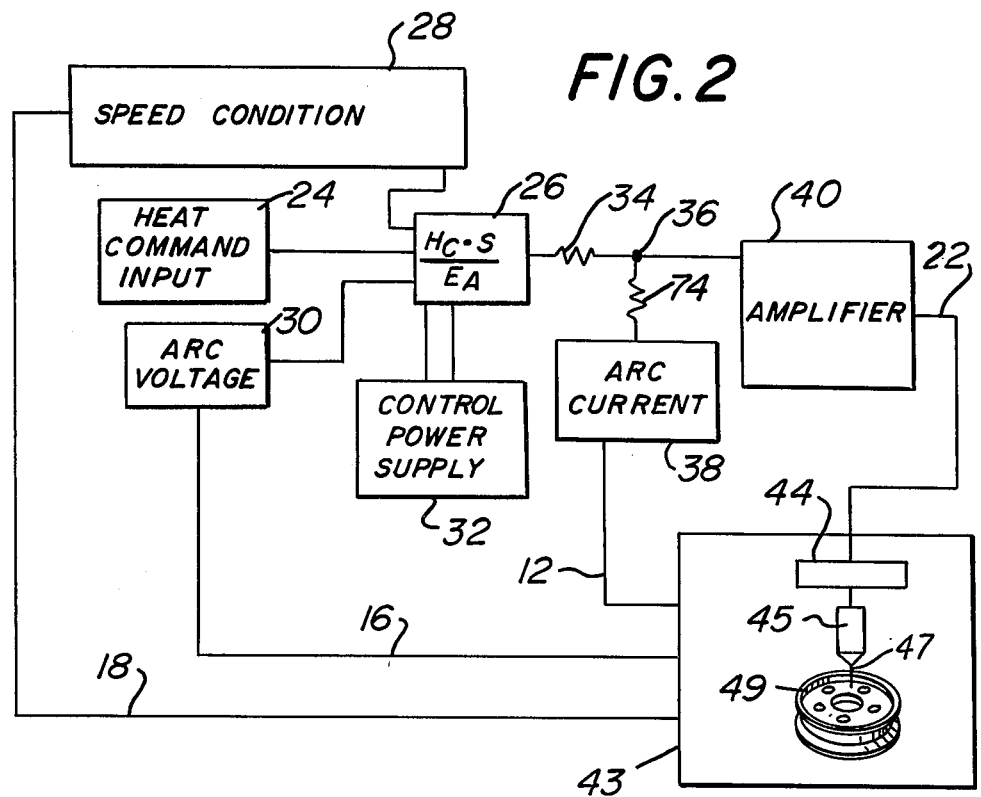
FIG. 2 is a block diagram illustrating in somewhat greater detail the welding system of FIG. 1.
Figure 3B:
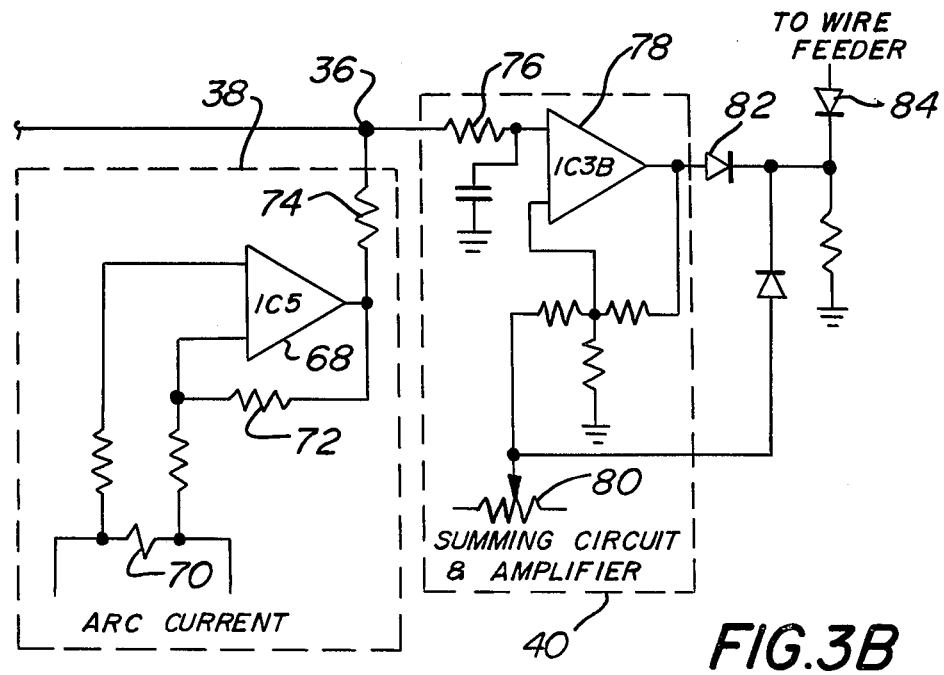

Referring to FIG. 2, three parameters are involved initially to produce the output analog signals. The heat command signal $H_C$ is developed by circuit 24 which represents joules per inch of length of the workpiece. The signal produced by the circuitry 26 is determined by operating on the three parameters including command heat, arc voltage and workpiece speed to arrive at an analog signal representing required current to produce the desired heat input $H_C$. The output signal from the circuit 24 is applied to a multiplier-divider circuit 26. A speed signal from a suitable circuit transducer that measures the speed of the workpiece is conditioned and scaled in circuit 28 for application to the multiplier-divider circuit 26. The signals from the heat input circuit 24 and the speed condition circuit 28 are multiplied in the circuit 26. The arc voltage signal is conditioned in circuit 30 and introduced into the multiplier-divider circuit 26. The arc voltage signal is combined with the product of the two signals from the circuits 24 and 28 to produce a signal representing the idealized current signal used in developing the idealized heat input signal at 24. The product of the heat input signal and the conditioned speed signal is divided by the arc voltage signal to produce a signal representing the idealized current signal. This current signal represents a standard to be followed in order to keep the process at the desired uniform heat input. The control power supply 32 is used to provide power for the various circuits involved.

The output signal from the multiplier-divider circuit 26 and the arc current signal from circuit 38 are summed at point 36 by summing resistors 34 and 74. The error signal at point 36 from the circuits 26 and 38 is amplified by amplifier 40. The output signal amplifier circuit 40 produces an error signal at the line 22 which is applied to control a wire feed drive mechanism 44 included in the welding machine 43. For purposes of illustration, a welding gun 45 is disposed to dispense wire 47 to produce welds at a workpiece 49, which is moved by conventional means. A wheel is illustrated as being the workpiece.

The wire speed is related to the arc current. When the wire enters the welding arc or puddles too rapidly, the arc current will rise due to a constant potential power source, and burn off more of the wire 47. If the wire 47 enters the arc too slowly, the current will be reduced to maintain a preset arc length (arc voltage) and not melt as much of the wire. Therefore, there is a direct relationship between the wire feed rate and the arc current. Consequently, it is relatively easy to control the speed of the wire feed otherwise, it would be almost impossible to control the actual current per se.

The error signal is applied to the motor circuit on the wire feeder and that causes the wire feed motor to speed up or slow down in response to the instantaneous signal values. Due to the feedback network, the instantaneous error signal is reduced to an acceptable low value. Basically, the present system involves comparing a precalculated value of the one of the welding parameters with the actual value of the same parameter taken during welding operation.

Referring to the combined drawings 3a and 3b, detail circuits are illustrated to show operation of the various blocks in FIG. 2. The heart of the system relates to the circuit 26 which is an integrated circuit that performs a multiplication and a division function. This particular circuit receives the command signal from the heat input circuit 24, multiplies that by a speed signal from the speed conditioner 28 and divides the product by a voltage signal from the circuit 30 to produce an output signal representing the arc current that is to be controlled.

The integrated circuit 46 is a standard off-the-shelf item that receives a digital speed control signal at a lead 48 and converts it to a proportional DC voltage. The input signal to the circuit 46 may be a series of pulses, for example, counting the number of gear teeth in the driving motor or other applicable methods. The gear teeth involved, for example, may pass under a sensor to produce pulses. Such sensors are conventional and well known to those skilled in the art.

A variable resistor 50 is used to set the exact scale factor to give a specific voltage output for a specific number of gear teeth per second, representing gear speed. For example, the scale factor may be one volt being equal to 10 inches per minute of welding speed.

An integrated circuit 52 is an impedance buffer amplifier to adapt the signal to a low impedance level for processing in an integrated circuit 54. The integrated circuit 54 makes it possible to modify the speed input to the processor to correct for weld speed changes when the workpiece speed rotation center is a fixed installation wherein the workpiece diameter may vary.

The circuit 24 includes an integrated circuit 56 and a potentiometer 58, which allows selection of the required heat command. The command is an analog voltage proportional to the heat input in joules per inch. For example, 10 volts on a potentiometer may equal 100,000 joules per inch. A potentiometer 60 is a control item to permit adjustment of the gain to set up the proper multiplication-division functions in the circuit 26.

Controls 61 and 62 in the control power supply provide for adjustment of the integrated circuit 26 so that it does perform this multiplication-division operation linearly over an extended voltage operation range from signal input levels of roughly 0.01 volts to 10 volts on each of the three inputs.

The arc voltage, which is taken directly from the welding circuit between the anode (wire) and the welding circuit ground of the welding piece, is developed across two resistors 64 and 66. These resistors are used to scale the higher welding arc voltages to the proper analog level required by integrated circuit 26.

The current signal is processed in the integrated circuit 68. This current is measured by virtue of the high current shunt in series with the ground of the welding circuit. The differential voltage across the shunt 70 is fed into the integrated circuit 68 with a feedback resistor 72. The feedback resistor 72 sets the gain of the amplifier integrated circuit 68 and it has the same scale factor in amperes as the output from the circuit 26 has in amperes.

The polarity of the output signals from the circuits 26 and 38 are such that when the output signals from circuits 26 and 38 are combined, the output of the circuit 38 is subtracted from the output signal from the integrated circuit 26. Thus an error voltage point 36 is developed that is the difference between the idealized current signal from the circuit 26 and the actual arc current signal from the circuit 38. This is the error signal which is applied to integrator circuit 78 of circuit 40 through resistor 76.

The output circuit of the integrated circuit 78 is also controlled by potentiometer 80 which permits an adjustment to be made to provide a reference level on the output of the circuit 40 to give a minimum wire feed speed for the specific size of wire, applicable to a size of wire that is presently in the machine. The output signal from the circuit 40 is applied to a pair of diodes 82 and 84 to the wire feeder motor control circuit in the welding machine (FIG. 2).

Various detailed elements used in the electrical circuits are well known to those skilled in the art. For example, the resistor networks illustrated are utilized to determine voltage levels at which the various integrated circuits will operate. The various capacitors are employed for coupling or bypassing signals in a well known manner.

The present invention is described primarily in connection with comparing singly or collectively signals representing welding parameters. As mentioned, any one of the three parameters involving arc current, arc voltage or workpiece speed may be used to produce the error signals. This means that the multiplier-divider circuit 26 would take different forms to perform different mathematical operations in a well known manner to arrive at the desired error signal.

As mentioned, the present invention has provided means for producing a relatively uniform heat input to a workpiece.

This is important when elements involving two different characteristics are to be joined or welded together. As previously mentioned, one of the elements may be a cold worked piece while the other element may be a hot rolled piece. In order to provide a good weld between the two pieces without causing an annealing of the cold worked pieces, it is necessary to operate within a certain consistent heat input to get the maximum weld quality.

What is claimed is:

1. In an automated system in which welding wire is heated as it is fed from a welding gun including a wire feed mechanism to perform a welding operation on a workpiece as relative movement is maintained between the welding tool and the workpiece,
   means for maintaining a fixed level of input heat applied to said workpiece during said welding operation, comprising:
   (a) a first electrical signal representing a standard input heat to be applied to said workpiece derived from standard workpiece speed, voltage and current signals required to maintain said fixed level of input heat;
   (b) means for developing three electrical signals representing functions relating to the speed of the workpiece, current from said welding tool, and the electrical voltage at said workpiece to control the speed of the wire fed from said wire mechanism;
   (c) means for combining said first electrical signal with two of said three electrical signals to produce an output electrical signal substantially equal to the third of said three electrical signals;
   (d) means for comparing one of said standard signals with said third signal to produce an error signal;
   (e) said one of said standard signals and said third signal being related to the same function, and
   (f) means for applying said error signal to said wire feed mechanism to control the speed of the wire fed from said wire mechanism,
   whereby the heat input produced in said welding operation is maintained substantially at said fixed level of input heat.

2. The invention as set forth in claim 1 wherein said welding operation comprises an arc welding process and said voltage and current signals are arc voltage and arc current signals, respectively.

3. The invention as set forth in claim 1 wherein said one of said standard signals and said third signal comprise current signals.

4. The invention as set forth in claim 3 wherein said means for combining comprise a multiplier-divider circuit in which said first electrical signal is multiplied by the signal representing the speed of said workpiece and the resulting product is divided by said arc voltage signal.

5. The invention as set forth in claim 4 wherein said workpiece comprises a first body of relatively thin cold roll material welded to a relatively thick rim of hot rolled material.

6. The invention as set forth in claim 5 wherein said workpiece comprises a wheel.

7. The invention as set forth in claim 6 wherein said three electrical signals comprise electrical analog signals.

8. The invention as set forth in claim 7 wherein said one of said standard signals and third electrical signal are algebraically summed to produce said error signal.

9. The invention as set forth in claim 8 wherein the analog signal representing the speed of said workpiece is derived from pulse signals from a sensor.

* * * * *